United States Patent
Ostergaard et al.

(10) Patent No.: US 9,215,729 B2
(45) Date of Patent: Dec. 15, 2015

(54) METHOD AND ARRANGEMENT IN A TELECOMMUNICATIONS SYSTEM

(75) Inventors: Jessica Ostergaard, Stockholm (SE); Carola Faronius, Jarfalla (SE); Anders Furuskar, Stockholm (SE); Magnus Lindstrom, Spanga (SE); Peter Moberg, Stockholm (SE); Walter Muller, Upplands Vasby (SE); Ghyslain Pelletier, Boden (SE); Mats Sagfors, Kyrkslatt (FI); Johan Torsner, Masaby (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 797 days.

(21) Appl. No.: 12/999,983

(22) PCT Filed: Dec. 22, 2008

(86) PCT No.: PCT/SE2008/051548
§ 371 (c)(1),
(2), (4) Date: Apr. 25, 2011

(87) PCT Pub. No.: WO2010/002307
PCT Pub. Date: Jan. 7, 2010

(65) Prior Publication Data
US 2011/0188422 A1    Aug. 4, 2011

Related U.S. Application Data

(60) Provisional application No. 61/077,388, filed on Jul. 1, 2008.

(51) Int. Cl.
H04W 72/12 (2009.01)
H04W 74/08 (2009.01)

(52) U.S. Cl.
CPC ...... *H04W 72/1284* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 5,276,911 A * | 1/1994 | Levine et al. | ............... | 455/510 |
| 8,107,987 B2 * | 1/2012 | Malladi et al. | ............... | 455/522 |
| 2006/0045047 A1 * | 3/2006 | Choi et al. | ............... | 370/329 |
| 2006/0154680 A1 * | 7/2006 | Kroth et al. | ............... | 455/515 |
| 2007/0153684 A1 * | 7/2007 | Choi et al. | ............... | 370/229 |
| 2008/0004058 A1 | 1/2008 | Jeong et al. | | |

(Continued)

FOREIGN PATENT DOCUMENTS

EP    2163006    3/2012

OTHER PUBLICATIONS

3rd Generation Partnership Project; Technical Specification Group Radio Access Network; Evolved Universal Terrestrial Radio Access (E-UTRA) Medium Access Control (MAC) Protocol Specification, Release 8, 3GPP TS 36.321 V8.0.0, Dec. 2007, pp. 13.*

(Continued)

*Primary Examiner* — Donald Mills

(57) ABSTRACT

The present invention relates to a method and apparatus for requesting scheduling of resources to be used for uplink communication of data in a communications system. If the repeated transmission by a user equipment of scheduling requests on an uplink control channel is determined to be unsuccessful, a random access transmission on a random access channel is initiated as a fallback procedure.

16 Claims, 8 Drawing Sheets

(56) References Cited

U.S. PATENT DOCUMENTS

| | | | |
|---|---|---|---|
| 2008/0058005 A1 | | 3/2008 | Zicker et al. |
| 2009/0274100 A1* | | 11/2009 | Montojo et al. ............. 370/328 |
| 2010/0254340 A1 | | 10/2010 | Park et al. |
| 2011/0188422 A1 | | 8/2011 | Ostergaard et al. |
| 2012/0039263 A1* | | 2/2012 | Moberg et al. ................ 370/329 |

OTHER PUBLICATIONS

LG Electronics Inc: "Issues with Scheduling Request Procedure". 3GPP TSG-RAN WG2 #61. R2-081083. Feb. 11-15, 2008. Sorrento, Italy.
International Report on Patentability corresponding to International Application No. PCT/SE2008/051548; Date of issuance of this report: Jan. 5, 2011; 6 pages.
"Physical Layer Procedures". 3GPP TS 36.213 v8.2.0. (Mar. 2008).
Ericsson: "RRC timers and counters for connection establishment". 3GPP TSG-RAN WG2 #62. R2-082595. May 5-9, 2008.
ETSI MCC: "Report of 3GPP TSG RAN WG2 meeting #62, Kansas City, USA, May 5-9, 2008". TSG-RAN Working Group 2 meeting #62bis. R2-083767. Jun. 31-Jul. 4, 2008. Warsaw, Poland.
ETSI MCC: "Report of 3GPP TSG RAN WG2 meeting #61bis, Shenzhen, China, Mar. 31-Apr. 4, 2008".TSG-RAN Working Group 2 meeting #62. R2-082800. May 5-9, 2008. Kansas City, USA.
Ericsson (Rapporteur): "Random Access Procedure model". 3GPP TSG-RAN WG2 #61 bis. R2-082030. Mar. 31-Apr. 4, 2008. Shenzhen, China.
QUALCOMM Europe: "RACH monitoring by RRC". 3GPP TSG-RAN WG2 #62. R2-082495. May 5-9, 2008. Kansas City, USA.
ETSI MCC: "Report of 3GPP TSG RAN WG2 meeting #62bis, Warsaw Poland, Jun. 31-Jul. 4, 2008". TSG-RAN Working Group 2 meeting #63. R2-083830. Aug. 18-22, 2008. Jeju, Korea.
Ericsson: "Handling of repeated D-SR failures". TSG-RAN WG2 Meeting #63. R2-084006. Aug. 18-22, 2008. Jeju, Korea.
Ericsson: "Handling of D-SR repetitions". 3GPP TSG-RAN2 meeting #63. R2-084007. Aug. 18-22, 2008. Jeju, Korea.
ETSI MCC: "Report of 3GPP TSG RAN WG2 meeting #63, Jeju, Korea, Aug. 18-22, 2008". TSG-RAN Working Group 2 meeting #63bis. R2-085971. Oct. 18-22, 2008. Prague, Czech Republic.
Ericsson, et al: "D-SR failure handling". 3GPP TSG-RAN2 Meeting #63bis. R2-085389. Sep. 29-Oct. 3, 2008. Prague, Czech Republic.
Ericsson, et al: "SR Clarifications". 3GPP TSG-RAN2 Meeting #63bis. R2-085689. Sep. 29-Oct. 3, 2008. Prague, Czech Republic.
Ericsson, et al: "D-SR failure handling". TSG-RAN WG2 Meeting #63bis. R2-085703. Sep. 29-Oct. 3, 2008. Prague, Czech Republic.
ETSI MCC: "Report of 3GPP TSG RAN WG2 meeting #63bis, Prague, Czech Republic, Sep. 29-Oct. 3, 2008". TSG-RAN Working Group 2 meeting #64. R2-087432. Nov. 10-14, 2008. Prague, Czech Republic.
"Medium Access Control (MAC) protocol specification." 3GPP TS 36.321 v8.4.0, Release 8. (Jan. 2009).
International Search Report for PCT/SE2008/051548, dated May 19, 2009.
"Limt Endless SR Transmission" LG Electronics Inc., XP-002522265, 3GPP TSG-RAN WG2 #62bis, R-2-083436, Warsaw, Poland, Jun. 30-Jul. 4, 2008, pp. 1-3.
$3^{rd}$ Generation Partnership Project; Technical Specification Group Radio Access Network; Evolved Universal Terrestrial Radio Access (E-UTRA); Physical Layer Procedures (Release 8); 3GPP TS 36.213; vol. 8.2.0 (Mar. 2008), pp. 1-30.
$3^{rd}$ Generation Partnership Project; Technical Specification Group Radio Access Network; Evolved Universal Terrestrial Radio Access (E-UTRA) Radio Resource Control (RRC); Protocol Specification (Release 8); XP-002522267; 3GPP TS 36.331; vol. 8.2.0 (May 2008), pp. 1-60.
Ericsson: "Default values for SRB configurations" 3GPP TSG RAN WG2 RAN2#62-bis. R2-083156. Jun. 30-Jul. 4, 2008. Warsaw, Poland.
LG Electronics: "Discussion on Scheduling Request" 3GPP TSG-RAN WG2 #59bis. R2-074245. Oct. 4-12, 2007. Shanghai, China.
EP Communication of a notice of Opposition dated Nov. 20, 2012.
Reply to Communication pursuant to Rule 79(1)EPC dated Apr. 23, 2013.
Notice of Opposition—Statement of Grounds dated Nov. 6, 2012.
China Office Action dated Jul. 16, 2014 for application No. CN200880130213.9.
Taiwan Office Action dated May 16, 2014 for application No. 098119100.

* cited by examiner

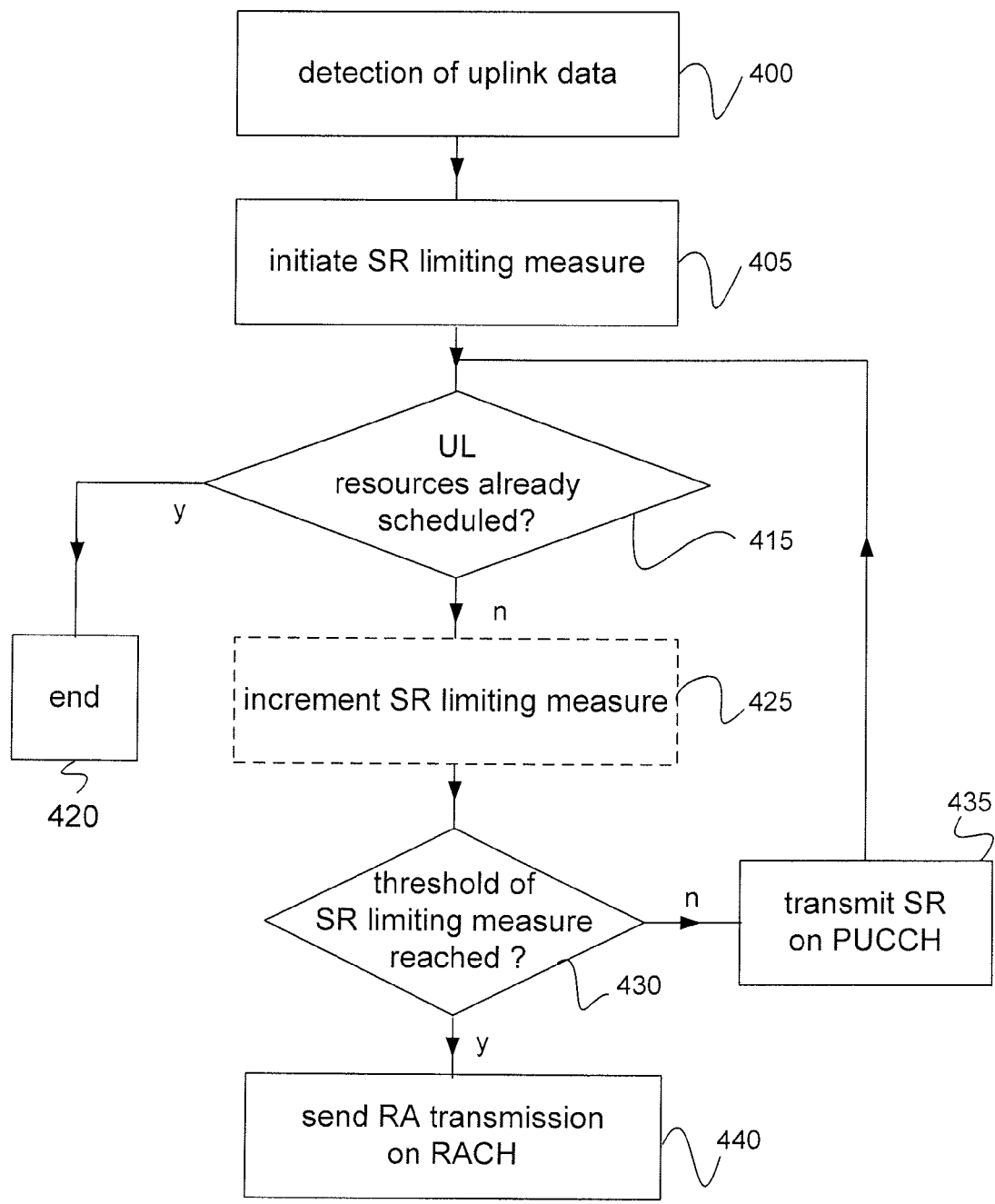

METHOD AND ARRANGEMENT IN A TELECOMMUNICATIONS SYSTEM

CROSS-REFERENCE TO RELATED APPLICATIONS

This application is a 35 U.S.C. §371 national stage application of PCT International Application No. PCT/SE2008/051548, filed on Dec. 22, 2008, which claims the benefit of U.S. Provisional Application No. 61/077,388, filed on Jul. 1, 2008, the disclosures and contents of which are incorporated by reference herein in their entireties. The above-referenced PCT International Application was published in the English language as International Publication No. WO 2010/002307 on Jan. 7, 2010.

TECHNICAL FIELD

The present invention relates to the field of communication of data, and in particular to scheduling of uplink data transmission in a communications system.

BACKGROUND

In a communications system operating according to the Orthogonal Frequency-Division Multiplexing (OFDM)-based Long Term Evolution (LTE) standard, data is transmitted between user equipments and radio base stations (referred to as evolved Node Bs, e-NodeBs) on a number of frequency resources which can be dynamically allocated to different communication sessions. A user equipment (UE) can request scheduling of resources for transmission of uplink (UL) data by sending a Scheduling Request (SR) to the e-NodeB to which it is currently connected. The e-nodeB will then respond to the scheduling request by sending a UL grant message to the user equipment, the UL grant message containing information on a frequency or frequencies on which the uplink data is to be transmitted (the timing of the scheduled resources for transmission of uplink data is typically implicitly given by the timing of the receipt of the UL grant message). The uplink data can then be sent by the user equipment on the scheduled time/frequency resources.

When a user equipment becomes active in an LTE system, the user equipment will typically be allocated a dedicated Physical Uplink Control Channel (PUCCH), which is a dedicated control channel on which inter alia scheduling requests may be transmitted to the e-nodeB. According to the current LTE standard, the power at which a scheduling request will be transmitted on the PUCCH channel is determined according to an expression provided in the standard (see 3GPP Technical Specification (TS) 36.213, version 8.2.0, section 5.1.2):

$$P_{PUCCH}(i) = \min\{P_{MAX}, P_{0\_PUCCH} + PL + \Delta_{TF\_PUCCH}(TF) + g(i)\}[dBm] \quad (1)$$

where $P_{0\_PUCCH}$ consists of a cell-specific parameter $P_{0\_NOMINAL\_PUCCH}$, which is broadcasted (in System Information Block 2, SIB2), and a UE-specific parameter $P_{0\_UE\_PUCCH}$, which is sent to the user equipment through dedicated signalling over the Radio Resource Control (RRC) protocol. $P_{0\_PUCCH}$ is a semi-statically configured parameter that is updated from time to time, typically on a time scale of hours. $P_{0\_PUCCH}$ is used to compensate for interference, but is not able to follow interference changes that are faster than the $P_{0\_PUCCH}$ update time scale.

PL is the UE's estimate of its own pathloss.

$\Delta_{TF\_PUCCH}(TF)$ corresponds to a transport format specific factor signalled through RRC. $\Delta_{TF\_PUCCH}(TF)$ takes the same value for all scheduling request transmissions in a cell, but could take a different value when other types of information is transmitted over the PUCCH; and g(i) represents absolute or accumulated Transmit Power Control (TPC) commands received by the user equipment from the e-nodeB (in Dedicated Control Information (DCI) formats 1, 2 or 3). TPC commands are used to adjust the transmission power of a user equipment in order to compensate for variations in noise and interference levels in a cell.

Hence, the transmission power at which scheduling requests will be transmitted on the PUCCH channel depends on the semi-static parameter $P_{0\_PUCCH}$, the pathloss estimation PL made by the user equipment, the transport format specific compensation $\Delta_{TF\_PUCCH}(TF)$ and the TPC command(s) received from the e-nodeB.

Expression (1) has been derived in order to ensure that a user equipment transmits at an appropriate power so that interference is kept low while sufficient quality of service is maintained.

However, there might be situations where the transmission power given by expression (1) is not sufficient, so that an e-nodeB to which the user equipment is currently connected fails to hear a scheduling request transmitted on the PUCCH channel. This can for example be the case when the interference in the cell in which the user equipment is active changes on a timescale that is shorter than the timescale of the transmission of TPC commands from the e-nodeB, or in the absence of TPC commands on a timescale shorter than the timescale of $P_{0\_PUCCH}$ updates. TPC commands are typically transmitted to the user equipment when there is dynamically scheduled downlink data to be transmitted to the user equipment. If there has been no dynamically scheduled downlink data to be transmitted to the user equipment for some period of time, it may be that the latest transmitted TPC command(s) do(es) not provide adequate compensation for the current interference in the cell.

If the combination of $P_{0\_PUCCH}$ and any TPC commands) is not an adequate compensation for interference plus noise, the user equipment will re-send its scheduling request, again and again using the same power, until the user equipment gets a grant. In unfortunate circumstances, the user equipment may end up in a more or less indefinite loop of sending scheduling requests that will never be heard by the e-NodeB. A similar situation may occur if the scheduling request fails for some other reason, for example if the user equipment fails to transmit correct scheduling requests, or transmits them on the wrong resource.

As can be seen from the above, there is a need to improve the robustness of the scheduling request procedure in mobile radio communications systems operating according to the LTE standard.

This need has been addressed in the standardisation proposal R2-083436, 3GPP TSG-RAN WG2 #62bis, wherein it is disclosed that the problem of endless scheduling request transmissions may be solved by re-using a recovery procedure which was initially standardised to stop endless attempts to transmit on the Random Access CHannel (RACH). In this solution, the Medium Access Control (MAC) protocol indicates to the RRC protocol when a problem with scheduling requests on PUCCH has been identified, based on a timer or a counter. When such a problem has been identified, RRC starts a timer referred to as T312. If a scheduling request is successfully received by the e-NodeB before the timer T312 has expired, MAC informs RRC. However, if no recovery has occurred at the expiry of the timer T312, RRC will take further action following the specification for radio link failure, used for example to handle random access channel failure. This is further described in TS 36.331 v8.2.0, Section 5.3.10 "Radio link failure related actions".

Although the method described in standardisation proposal R2-083436 will ensure that a user equipment will never end up in a situation where it is transmitting an endless number of scheduling requests that will never be heard, it does so at great expense. To perform the procedure standardised for the expiry of T310 is time consuming and requires a large amount of signalling.

SUMMARY

An object of the present invention is to find an efficient way of avoiding that a user equipment ends up in a situation where a large or endless number of scheduling requests are unsuccessfully transmitted.

This object is achieved by a method for requesting scheduling of resources to be used for uplink communication of data from a user equipment in a communications system, wherein the number of scheduling requests that the user equipment will repeatedly transmit on a dedicated uplink control channel in relation to the data while not having been granted uplink resources is limited by monitoring, in the user equipment, whether a threshold value representing a maximum limit has been reached. In response to the threshold value having been reached, a random access transmission on a random access channel is initiated.

The object is further achieved by a user equipment for communicating in a communications system. The user equipment is arranged so that the number of scheduling requests that the user equipment will repeatedly transmit in relation to the same uplink data on an uplink control channel while not having been granted uplink resources is limited in that the user equipment is adapted to monitor whether a maximum limit has been reached. The user equipment is adapted to initiate a random access transmission on the random access channel in response to said maximum level having been reached.

By the inventive method and apparatus is achieved that both the time and signalling required in order to provide a user equipment having poor power setting on the uplink control channel with scheduled uplink resources will be greatly reduced, thereby improving the user experience as well as reducing bandwidth consumption and interference in the communications system, along with power consumption in the user equipment. By applying embodiments of the invention, no radio resource control connection re-establishment procedure will have to be performed in the time interval after the threshold value has been reached and before the initiation of the random access transmission. For example, a cell to which the user equipment is connected when the maximum value has been reached, may be maintained as the selected cell during and after the random access procedure without performing cell evaluation.

The time required in order to provide the user equipment with an uplink grant will be reduced not only by the fact that less signalling will have to be transmitted between the user equipment and the radio base station, but it may also be reduced by setting the maximum limit to a lower value, since the cost of determining the request procedure on PUCCH as unsuccessful and thus leaving said scheduling request procedure will be less than in the prior art solution. The risk of setting the limit lower is thus reduced. Furthermore, there will be less internal interaction between the protocol layers of the user equipment (for example between MAC and RRC).

An embodiment of the inventive method may comprise the steps of initiating a measure used for limiting the number of transmitted scheduling requests; checking whether the measure has reached a threshold value, and if no uplink resources have been granted and the measure has not reached a threshold value, transmitting a scheduling request on an uplink control channel and repeating the step of checking, whereas if no uplink resources have been granted and the measure has reached the threshold value, a random access transmission on the random access channel is transmitted.

In one embodiment of the invention, the uplink control channel resources are kept by the user equipment even if no uplink resources have been granted when the threshold value has been reached. Hereby is achieved that the amount of signalling is further reduced, since these resources will not have to be configured by a re-configuration message transmitted from the radio base station, and the need of signalling such a message is hence removed. In this embodiment, the method may further comprise including an indication, in the random access transmission, that the uplink control channel has not been released. In another embodiment, the uplink control channel is released when the maximum limit has been reached.

The object is further achieved by a computer program product for use in a procedure for requesting scheduling of uplink resources. The computer program product may advantageously be stored on memory means adapted to be included in a user equipment.

Moreover, the object is yet further achieved by a radio base station for communication with a user equipment in a communications system arranged to receive random access transmissions from user equipments, wherein the radio base station is adapted to determine whether a user equipment from which a random access transmission has been received has access to dedicated uplink control channel resources for the transmission of a scheduling request; and wherein the radio base station is further adapted to send a power control command to a user equipment in response to having determined that the user equipment has access to dedicated uplink control channel resources for the transmission of a scheduling request, the power control command including instructions to set the power level at which scheduling request transmissions on dedicated uplink control channel resources at a higher level. By the inventive radio base station is achieved that the power level at which the user equipment will be transmitting will be adjusted, thereby reducing the risk of further unsuccessful scheduling request transmissions.

BRIEF DESCRIPTION OF THE DRAWINGS

For a more complete understanding of the present invention, and the advantages thereof, reference is now made to the following description taken in conjunction with the accompanying drawings, in which:

FIG. 3b is a signalling diagram according to another embodiment of the present invention in a scenario similar to that in FIG. 3a.

FIG. 4a is a flowchart illustrating an embodiment of the present invention.

DETAILED DESCRIPTION

Figure 1:
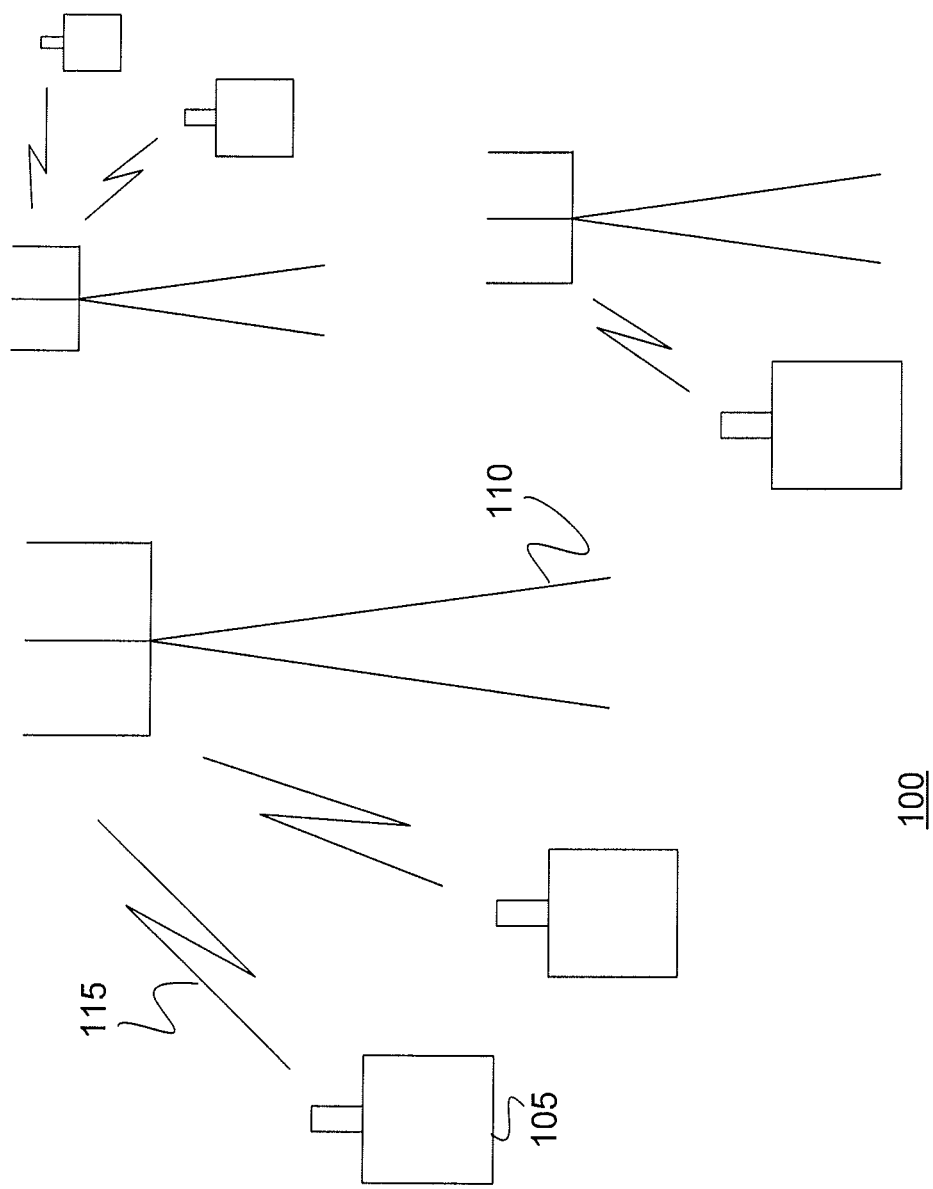
FIG. 1 is a schematic overview of a communications system operating according to the LTE standard.

A mobile radio communications system operating according to the LTE standard is schematically illustrated in FIG. 1. The communications system 100 of FIG. 1 comprises a plurality of user equipments 105 and a plurality of radio base stations 110, in the following referred to as e-nodeBs 110. A user equipment 105 may communicate wirelessly with an e-nodeB 110 via a radio interface 115.

According to the LTE standard, the e-nodeB 110 can allocate a periodic resource on a Physical Uplink Control CHannel (PUCCH) to a user equipment 105. The resource on the PUCCH channel can be used for dedicated signalling of, for example, scheduling requests from the user equipment 105 to the e-nodeB 110.

Figure 2:
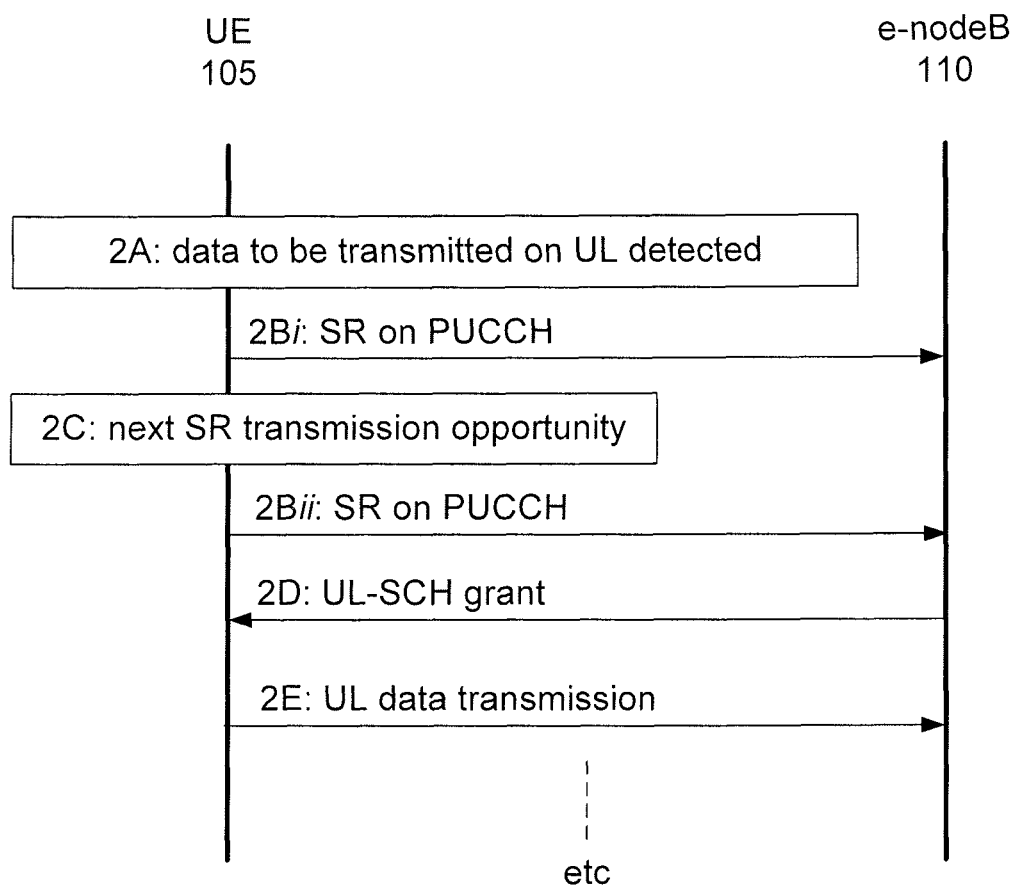
FIG. 2 is a signalling diagram illustrating a scenario where a user equipment is successful in signalling a scheduling request to an e-nodeB at the second attempt.

A scheduling request signalling scenario according to the present standard, wherein it is assumed that PUCCH SR resources have been configured for a user equipment 105, is illustrated in FIG. 2. At event 2A, the user equipment 105 detects data that is to be transmitted on the uplink. The user equipment 105 then transmits a scheduling request 2Bi on PUCCH, to the e-nodeB 110 to which the user equipment 105 is currently connected, in order to request uplink transmission resources. The power at which the scheduling request 2Bi is transmitted is determined by means of expression (1). In the scenario illustrated in FIG. 2, the e-nodeB 110 does not respond to the first scheduling request 2Bi. This may for example be because the power of scheduling request transmission was too low compared to the interference in the cell, so that the e-nodeB 110 cannot detect the scheduling request 2Bi. The user equipment 105 then transmits a scheduling request 2Bii on its next available PUCCH SR resource, the scheduling request 2Bii being identical to the scheduling request 2Bi and transmitted at the same power (the SR resources occur periodically). In the scenario of FIG. 2, the scheduling request 2Bii was successfully received by the e-nodeB, which in response sends an uplink scheduling (UL-SCH) grant message 2D to the user equipment 105. The user equipment 105 can then, in data transmission 2E, transmit the uplink data detected at event 2A by use of the transmission resources allocated in UL-SCH grant message 2D.

As illustrated in FIG. 2, the current standard provides that if a user equipment 105 does not receive an UL grant message 2D before the occurrence of its next available PUCCH SR resource after having sent a scheduling request 2B, another identical scheduling request 2B will be sent by the user equipment 105 to the e-nodeB 110 at the same power level. In most circumstances, this procedure will ensure that the e-nodeB 110 receives a scheduling request 2B without a too high impact on the interference situation in and around the cell. However, as mentioned above, there may be situations where the power level given by expression (1) is too low compared to the interference and noise level in the cell, so that none of the scheduling requests 2B transmitted from the user equipment 105 to the e-nodeB 110 will ever be detected by the e-nodeB 110, or where a scheduling request 2B will only be detected by the e-nodeB 110 after the transmission of numerous scheduling requests 2B by the user equipment 105. Although such numerous or endless transmissions of scheduling requests 2B will typically be rather rare, the problems caused when it does happen will be considerable.

As mentioned above, it has been suggested in the standardisation proposal R2-083436 that the scenario of endless scheduling request transmissions be limited by utilization of the same procedure of setting a timer T312 that has been proposed for limitation of endless RACH attempts. However, although fulfilling the requirement of stopping endless scheduling request transmissions and thereby improving the performance of the communications system 100, this procedure has the drawback of being slow and signalling intense in itself, since it originally aims at solving a problem more serious than failure of receiving scheduling requests. A much more efficient way of stopping the endless scheduling request transmissions will be described below.

According to the present invention, the problem of numerous, or even endless, scheduling request transmissions from a user equipment 105 can be efficiently solved by sending, from the user equipment 105 when the user equipment 105 determines that it has entered a state of repetitious unsuccessful scheduling request transmissions 2B, a Random Access (RA) transmission on the Random Access CHannel (RACH).

The RACH control channel is shared by all user equipments 105 within a cell, and is used by a user equipment 105, for signalling to the e-nodeB 110 of the cell, when no dedicated resources have yet been allocated to the user equipment 105, for example for initial access upon power-on or for handover of the user equipment 105 between cells, or in order to request transmission resources for uplink data when no PUCCH SR resources have yet been assigned to the user equipment 105. Since RACH is a shared, contention based channel, it is generally desired to keep the signaling load on the channel low, in order to minimize the risk of collision between different user equipments 105 on the channel, as well as to keep interference on the channel low. However, the advantages of breaking a dead-lock situation of repetitious unsuccessful scheduling request transmissions without having to go through the re-establishment procedure will outweigh the disadvantages of transmitting on the RACH.

By using a random access procedure as a fallback when a user equipment 105 has transmitted numerous unsuccessful transmission requests on the dedicated PUCCH channel, the state of repetitious transmission of unsuccessful scheduling transmission requests can efficiently be broken without having to use a radio link failure procedure. The power at which a first RA transmission on RACH is transmitted is given by an expression different to (1), and if an RA transmission on the RA channel fails and the RA transmission for some reason does not reach the e-nodeB 110, the user equipment 105 will transmit another RA transmission at a higher power. The power will be ramped up for subsequent RA transmissions, until an RA transmission reaches the e-nodeB 110 (or until a maximum power level has been reached, or a maximum number of RA transmissions have been transmitted at which point the radio link failure procedure of TS 36.331 section 5.3.7 will be performed). Hence, the probability of the e-nodeB hearing the user equipment 105 is greatly improved compared to the present standard.

Furthermore, by transmitting an RA message on RACH instead of setting a timer T312 at the expiry of which a radio link failure procedure is performed, great improvements are achieved in terms of recovery times and reduced signalling.

To enter a radio link failure procedure in order to break the loop of unsuccessful scheduling request transmissions, as suggested in the standardisation proposal R2-083436, involves a number of actions which can be avoided in the method according to the present invention. A group of radio link failure actions that have to be performed in the procedure proposed in R2-083436, but which will not have to be performed if the method of the invention is used, is jointly referred to as the RRC Connection Re-establishment procedure. RRC Connection Re-establishment includes a cell reselection procedure, the reset of MAC and re-establishment of Radio Link Control (RLC) for all radio bearers (see TS 36.331 v8.2.0, Sections 5.3.7 and 5.7.10). These actions will not have to be performed when using the inventive method for breaking the loop of unsuccessful scheduling requests. The cell to which the user equipment 105 is connected when the threshold value is reached can remain as the selected cell without any cell evaluation, and the MAC and RLC configuration can remain as they were prior to the measure having reached the threshold value. Hence, the user experience of the person or machine waiting for the user equipment 105 to transmit uplink data will be greatly improved.

The present invention may advantageously be applied to any communications standard wherein scheduling requests are normally transmitted over a dedicated control channel the power of which is not increased between re-transmission attempts, and wherein there is a control channel the power of which is ramped up between transmission attempts. A dedicated control channel the power of which is not increased between re-transmission attempts, of which the LTE PUCCH is an example, is here referred to as an uplink control channel. A control channel the power of which is ramped up between re-transmission attempts, of which the LTE RACH is an example, is here referred to as a random access channel. However, in order to simplify the description, the invention will in the following be described in terms of the LTE standard, and uplink control channels will be exemplified by the LTE PUCCH, whereas random access channels will be exemplified by the LTE RACH.

Figure 3A:
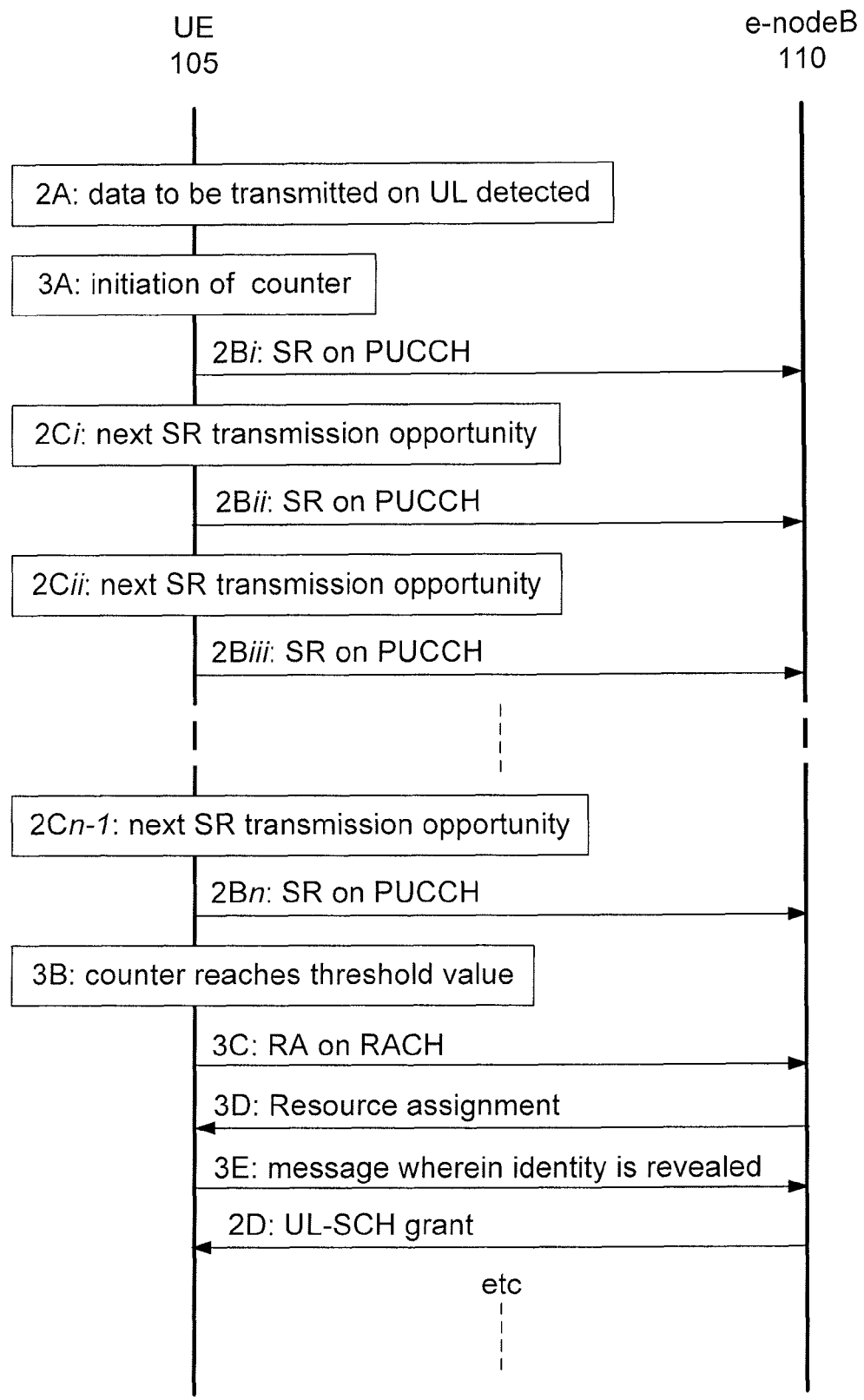
FIG. 3a is a signalling diagram according to an embodiment of the present invention in a scenario where the user equipment does not receive a UL-SCH grant even after repeated scheduling request transmissions on PUCCH.

FIG. 3a is a flowchart illustrating an embodiment of the invention in a scenario where the e-nodeB 110 does not detect any of the scheduling requests 2B transmitted from the user equipment 2a even after the transmission of numerous scheduling requests 2B.

At event 2A of FIG. 3a, the user equipment 105 detects data that is to be transmitted on the uplink via the e-nodeB 110. Upon detection of such uplink data, a counter is initiated at event 3A. The counter will be used for determining if/when the user equipment 105 should consider any repetitious transmission of scheduling requests 2B to be unsuccessful. The counter could for example be a timer counting the amount of time lapsed since the counter was initiated, or a counter counting the number of scheduling requests transmitted since the counter was initiated. After having initiated the counter, the user equipment 105 transmits a first scheduling request 2Bi on the PUCCH channel (alternatively, the event 3A of initiating the counter could occur directly after, rather than before, the transmission of the first scheduling request 2Bi).

In the scenario of FIG. 3a, the user equipment 105 does not receive a response from the e-nodeB 110 before the occurrence of its next PUCCH SR resource at event 2Ci. In fact, the transmission of scheduling requests 2B occurs a plurality of times in the scenario of FIG. 2B, without the user equipment 105 receiving any response from the e-nodeB 110. At event 3B, after the transmission of an $n^{th}$ scheduling request 2Bn, the counter which was initiated at event 3A reaches a threshold value representing a maximum limit, thus indicating that the attempt at transmitting scheduling requests on the PUCCH channel should be considered unsuccessful. The maximum limit could for example be a maximum amount of time, or a maximum number of scheduling requests having been transmitted, since the counter was initiated.

In response to the counter reaching the threshold value at event 3B, an RA transmission 3C is sent on the RA channel. If this RA transmission 3C is successfully received by the e-nodeB 110, as is the case in the scenario of FIG. 3a, the e-nodeB 110 will respond by sending a resource assignment message 3D, indicating resources which should be used by the mobile station 105 for further signalling. The user equipment 105 will respond by sending a message 3E in which it reveals its identity to the e-nodeB 110.

When the e-nodeB 110 receives the message 3E, the e-nodeB 110 will, if suitable uplink resources are available in the cell, grant uplink resources to the user equipment 105 by sending a UL-SCH grant message 2D to the user equipment 105. Furthermore, upon receipt of the message 3E, the e-nodeB 110 knows that the RA transmission 3C was sent by a user equipment 105 which has already been allocated dedicated PUCCH SR resources, and can therefore conclude that the reason for the user equipment 105 sending the RA transmission 3C is that the transmission of a scheduling request 2B on PUCCH has been unsuccessful. The e-nodeB could then advantageously act to improve the power setting of the PUCCH for the user equipment 110, for example by transmitting a suitable TPC command to the user equipment 105, or by updating the value of the UE-specific parameter $P_{0\_UE\_PUCCH}$ in a message to the user equipment 105, in order to update the parameter $P_{0\_PUCCH}$ (alternatively, the cell specific parameter $P_{0\_NOMINAL\_PUCCH}$ could be updated).

If the RA transmission 3C is not safely received by e-nodeB 110 so that the user equipment 105 does not receive a response within a pre-determined time limit, the user equipment 105 will re-transmit the RA message 3C, but at a higher power level than the transmission of the first RA transmission. Hence, the chances that the e-nodeB 110 will eventually hear an RA transmission on the RACH are much higher than those of the e-nodeB 110 hearing repeated scheduling request transmissions on the PUCCH when the PUCCH power level is not sufficient. Re-transmission of RA messages at an increasing power level is part of the prior art and is not shown in FIG. 3a.

When the counter threshold is reached at event 3B, the user equipment 105 could either keep the PUCCH resources and/or any assigned Sounding Reference Symbols (SRS), or release such resources (Sounding Reference Symbols are transmitted by a user equipment 105 if it is configured to do so, and are used by the receiving e-nodeB 110 to derive information on the uplink transmission channel). In the embodiment of the invention illustrated in FIG. 3a, the PUCCH and/or SRS resources are maintained. An advantage of keeping the PUCCH and/or SRS resources is that no re-configuration message would have to be transmitted from the e-nodeB 110 in order to re-assign such resources, thus reducing the amount of signaling even further. However, even if the PUCCH and/or SRS resources are released and thereafter re-configured, the invention shows great advantages compared to the prior art.

Figure 3B:
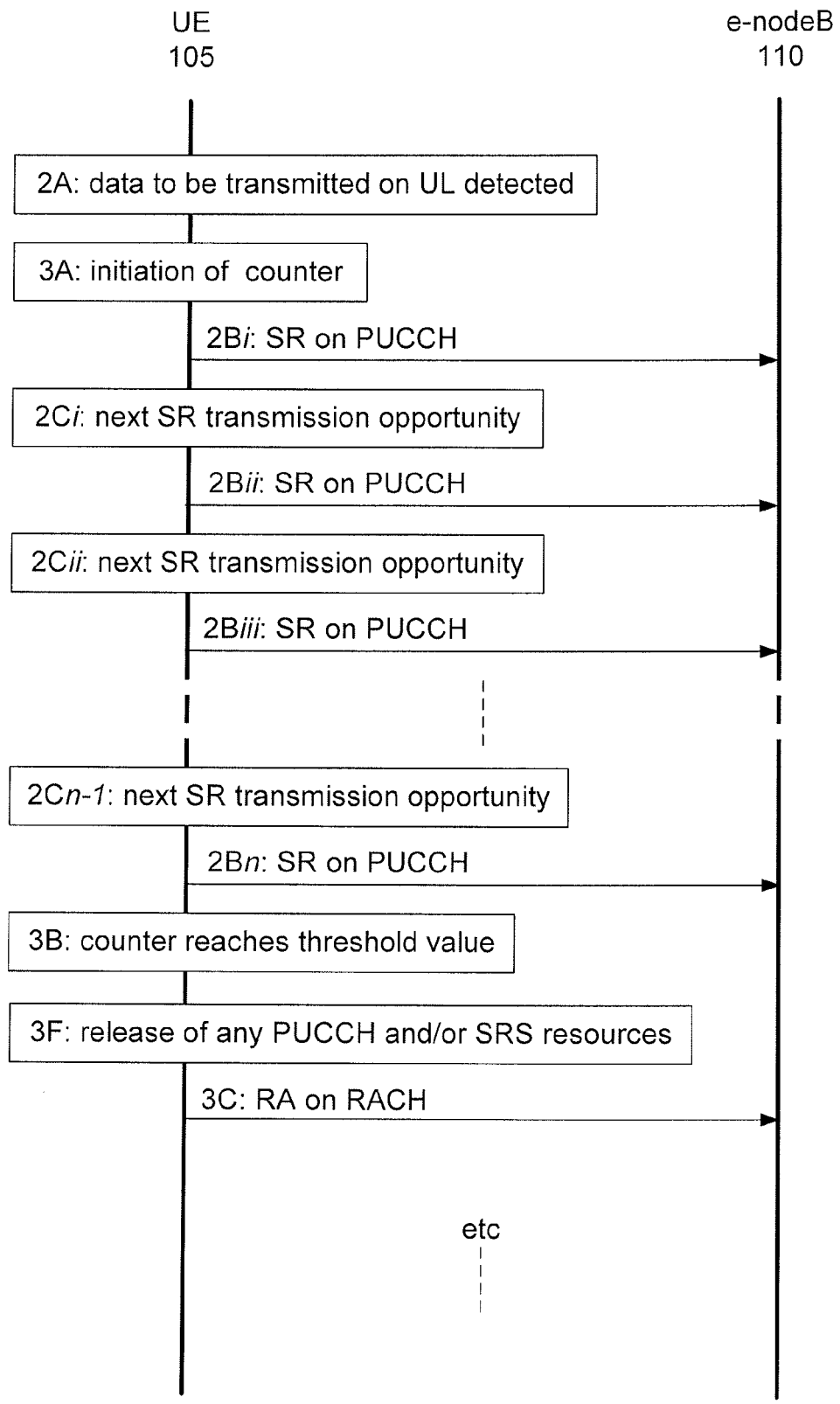

A signaling diagram illustrating the embodiment where the PUCCH and/or SRS resources are released by the user equipment 105 is shown in FIG. 3b. The procedure of FIG. 3b is the same as the procedure of FIG. 3a, up until the event 3B where the counter reaches the threshold value. When the counter has reached the threshold value in FIG. 3b, any PUCCH resources and/or Sounding Reference Symbols allocated to the user equipment 105 are released at event 3F, prior to sending the RA transmission 3C on RACH. Alternatively, the event 3F wherein the PUCCH and SRS resources of user equipment 105 are released could take place after the sending of the RA transmission 3C. The e-nodeB 110 can then take appropriate action, given that it knows that the user equipment 105 has released its configured PUCCH and SRS resources, such as for example assign PUCCH and/or SRS resources to the user equipment 105 in a known manner. Furthermore, upon configuring new PUCCH resources to the user equipment 110, the e-nodeB 110 could advantageously apply the knowledge that the power at which the user equipment was previously transmitting over PUCCH was too low when selecting an appropriate value of the parameter $P_{0\_UE\_PUCCH}$.

Figure 3C:
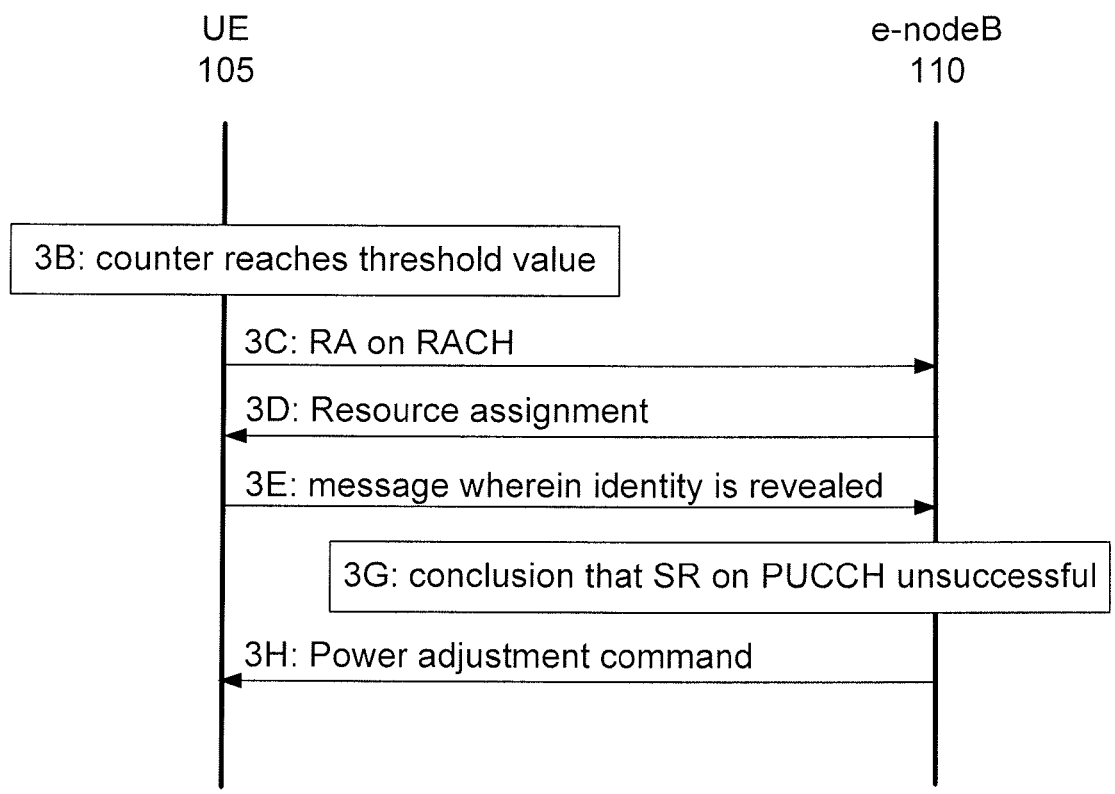
FIG. 3c is a signalling diagram according to an embodiment of the invention wherein the e-nodeB acts to improve the power setting of the PUCCH.

FIG. 3c illustrates an exemplary scenario in an embodiment of the invention wherein the e-nodeB acts, in response to having determined that a user equipment 105 transmitting on RACH has access to PUCCH SR resources, to adjust the power level used by the user equipment 110 for PUCCH transmissions. The scenario could apply to either of the embodiments illustrated in FIGS. 3a and 3b, respectively. At event 3B of FIG. 3c, the counter mentioned above reaches its threshold value. In response to this, the user equipment 105 transmits a RA transmission 3C to the e-nodeB 110 (while either releasing or maintaining any PUCCH and/or SRS resources). As described above in conjunction with FIG. 3a, the e-nodeB 110 then responds by sending a resource assignment message 3D to the user equipment 105, which in turn responds by transmitting a message 3E wherein the user equipment 105 reveals its identity. At event 3G of FIG. 3c, the e-nodeB 110 determines that the user equipment 105 has access to PUCCH SR resources, and therefore concludes that the user equipment 105 has been unsuccessful in transmitting scheduling requests over PUCCH. The e-nodeB 110 then transmits a power adjustment command to the user equipment 105, instructing the user equipment 105 to increase the power level at which PUCCH SR transmissions have been transmitted. As mentioned above, such power adjustment command could for example be a TPC command, particularly suitable if the PUCCH/SRS resources have been maintained, or a message resulting in the user equipment 105 applying a different value for the parameter $P_{0\_PUCCH}$. The event 3G and the sending of the power adjustment command could take place at any time after the receipt of the message 3E.

According to the present standard, the e-nodeB 110 will provide a user equipment 105 with a new timing advance (TA) value upon receipt of an RA transmission from the user equipment 105. However, according to the invention, both in the embodiment where the PUCCH and/or SRS resources are released and where they are kept, the e-nodeB 110 could be adapted to identify that the RA transmission 3C is sent by a user equipment 105 that is still synchronized (in UL synch) with the e-nodeB 110, and that no new TA value will have to be transmitted. Hence, even less signaling would have to be transmitted over the radio interface 115.

If a communications system 100 allows a user equipment 105 to either keep its PUCCH and/or SRS resources upon transmission of RA when the counter reaches its threshold, as illustrated in FIG. 3a, or to release such resources, as illustrated in FIG. 3b, it would be advantageous if there were a way for the e-nodeB 110 to determine whether a particular user equipment 105, having been allocated PUCCH and/or SRS resources and from which the e-NodeB 110 has received an RA message 3C, has kept its PUCCH and/or SRS resources, or whether the user equipment 105 has released its previously allocated PUCCH and/or SRS resources. An indication of whether or not the PUCCH and/or SRS resources have been released by the user equipment 105 could for example be given by the value of the preamble transmitted in the RA message 3C. A preamble is a bit sequence that is randomly selected by the user equipment 105 from a group of allowed preambles, and included in a RA transmission in order to allow for contention resolution. A set of the allowed RA preambles could be set aside for user equipments 105 that have kept its PUCCH and/or SRS resources. Other manners of indicating to the e-nodeB 110 whether or not a user equipment 105 has kept or released its PUCCH and/or SRS resources could alternatively be used. In some communications systems 100, it may be predefined whether or not a user equipment 105 should keep or release its PUCCH and/or SRS resources upon sending an RA transmission 3C when the counter reaches its threshold at event 3B.

FIG. 4a is a flowchart wherein an embodiment of the inventive method is illustrated. At step 400, data to be transmitted on the uplink is detected. At step 405, an SR limiting measure is initiated, the SR limiting measure for limiting the number of scheduling requests 2B that will be transmitted on the PUCCH before it is determined that the scheduling request transmissions on PUCCH are unsuccessful. The SR limiting measure could typically be the number of transmitted scheduling requests on PUCCH, in which case this number would typically be set to zero at step 405, or the time lapsed since the initiation of the measure, or since the transmission of the first scheduling request after the uplink data was detected in step 400. In step 415, it is then checked whether UL resources that could be used by the uplink data detected at step 400 have yet been scheduled. If so, the scheduling request procedure is ended at step 420, and the uplink data is transmitted on the scheduled resources. However, if no UL resources have yet been granted, it will be checked in step 430 whether a threshold value of the SR limiting measure has yet been reached. When the measure is the number of scheduling requests transmitted on PUCCH, the measure should be incremented after each scheduling request transmission on PUCCH and before step 430 is entered. In the flowchart of FIG. 4a, the measure is incremented in step 425, which is entered after it has been determined in step 415 that no uplink resources are scheduled. However, step 425 could be incremented at any stage before the threshold check of step 430. Furthermore, as indicated by the dashed lines surrounding the box representing step 425, when the measure is the amount of time lapsed since the measure was initiated at step 405, there will typically be no discrete incrementation step 425, but rather, the measure will be increased continuously with the flow of time.

If it is found in step 430 that the threshold of the SR limiting measure has not yet been reached, step 435 is entered, wherein a scheduling request 2B is transmitted on PUCCH. Step 415 is then re-entered. If it is found in step 430 that the threshold of the measure has been reached, on the other hand, step 440 will be entered. When the measure is the number of scheduling requests transmitted on the PUCCH since the measure was initiated at step 405, the threshold value could typically take one of the values 4, 8, 16 or 32 scheduling request transmissions 2B, but other values may also be used.

In step 440, an RA transmission 3C is transmitted over RACH. As discussed above, the RA transmission 3C is transmitted at a different power than the scheduling request transmissions 2B. Furthermore, if the user equipment 105 does not receive a response from the e-nodeB 110 to an RA transmission, another RA transmission 3C will be sent at a higher power. When e-nodeB 110 detects an RA transmission 3C from the user equipment 105 which already has been assigned dedicated PUCCH SR resources, the e-nodeB will typically choose to schedule resources for the user equipment (cf.

FIGS. 3a and 3b). Hence, by performing the RA transmission 3C in step 440, the loop of unsuccessful scheduling request transmissions on PUCCH detected at step 430 will efficiently be broken.

Figure 4B:
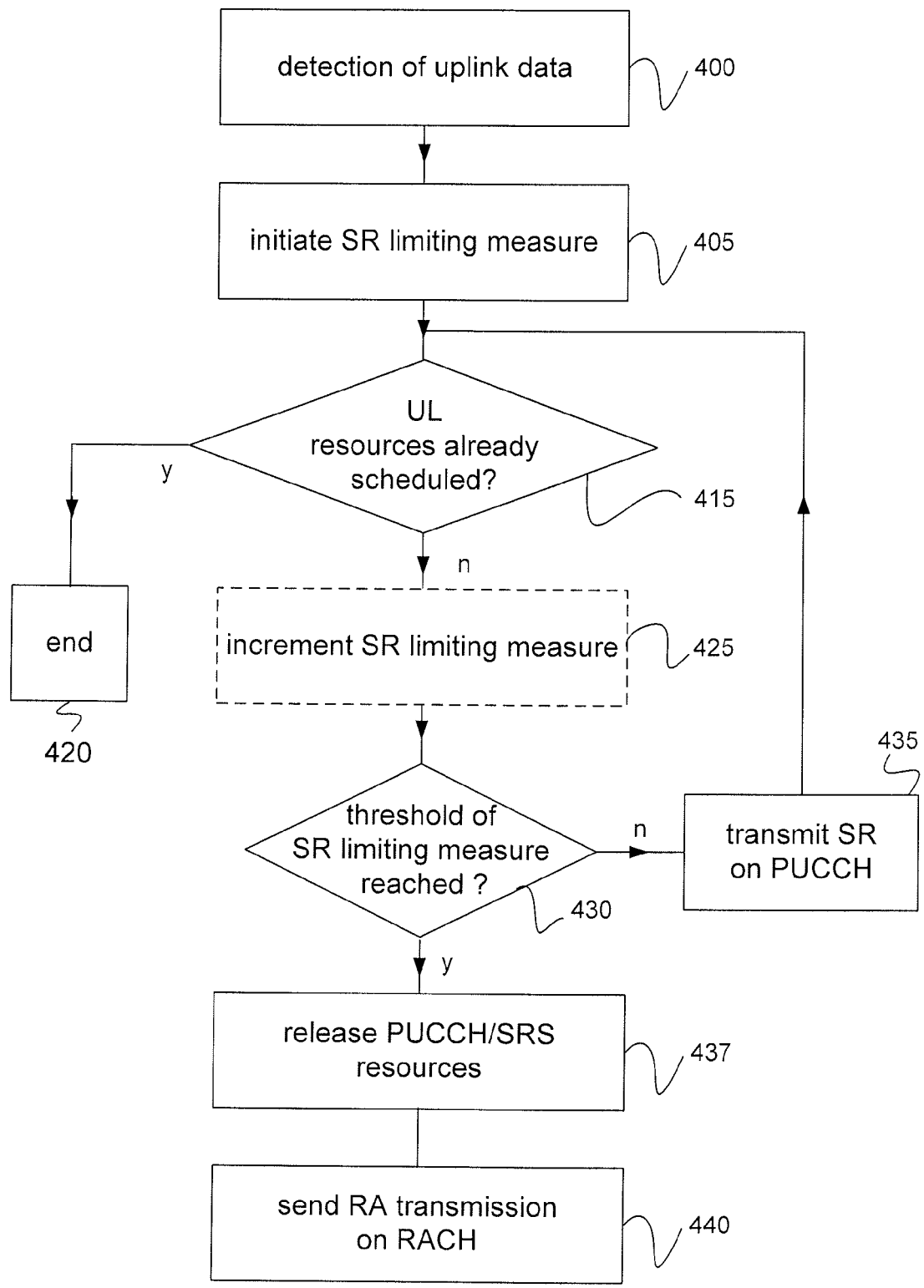
FIG. 4b is a flowchart illustrating another embodiment of the present invention.

In FIG. 4b, a flowchart is shown which illustrates an embodiment of the invention wherein the user equipment 105 releases its assigned PUCCH and/or SRS resources when the SR limiting measure reaches its threshold value. Up until step 435, the flowchart of FIG. 4b is the same as that of FIG. 4a. However, in the embodiment illustrated by FIG. 4b, the PUCCH resources and/or any Sounding Reference Symbols allocated to user equipment 105 are released in step 437, when it has been determined in step 430 that the threshold of the limiting measure has been reached. When the PUCCH and/or SRS resources have been released, step 440 is entered, wherein an RA transmission 3C on RACH is sent to the e-nodeB 110. In a communications system 100 wherein it is optional whether any assigned PUCCH and/or SRS resources are released when the threshold value has been reached, the RA transmission sent in step 440 could include an indication on whether or not the PUCCH and/or SRS have been released, as discussed above.

When the RA transmission of step 440 of FIGS. 4a and 4b has been sent, the user equipment 105 would typically stop the repeated transmission of scheduling requests 2B on PUCCH. However, in the embodiment illustrated in FIG. 4a, further scheduling request transmissions on PUCCH could be sent even after the transmission of RA transmission 3C in step 440.

The methods of FIGS. 4a and 4b could be varied in many ways. For example, a first scheduling request 2B could be transmitted before it is checked in step 415 whether any UL resources have been scheduled; the SR limiting measure initiation of step 405 could be performed after the transmission of a first scheduling request, and so forth.

The methods illustrated in FIGS. 4a and 4b could advantageously be performed in a user equipment 105. The re-entry of step 415 after having performed the scheduling request transmission of step 435 could advantageously be performed at each Transmission Time Interval (TTI). The check performed in step 415 could be a check as to whether uplink resources have been scheduled for the current TTI, or whether uplink resources are scheduled for any of the current or future TTIs.

The inventive method illustrated in FIGS. 3 and 4 could be implemented at any protocol layer, and could for example be implemented by use of MAC and/or RRC.

Figure 5:
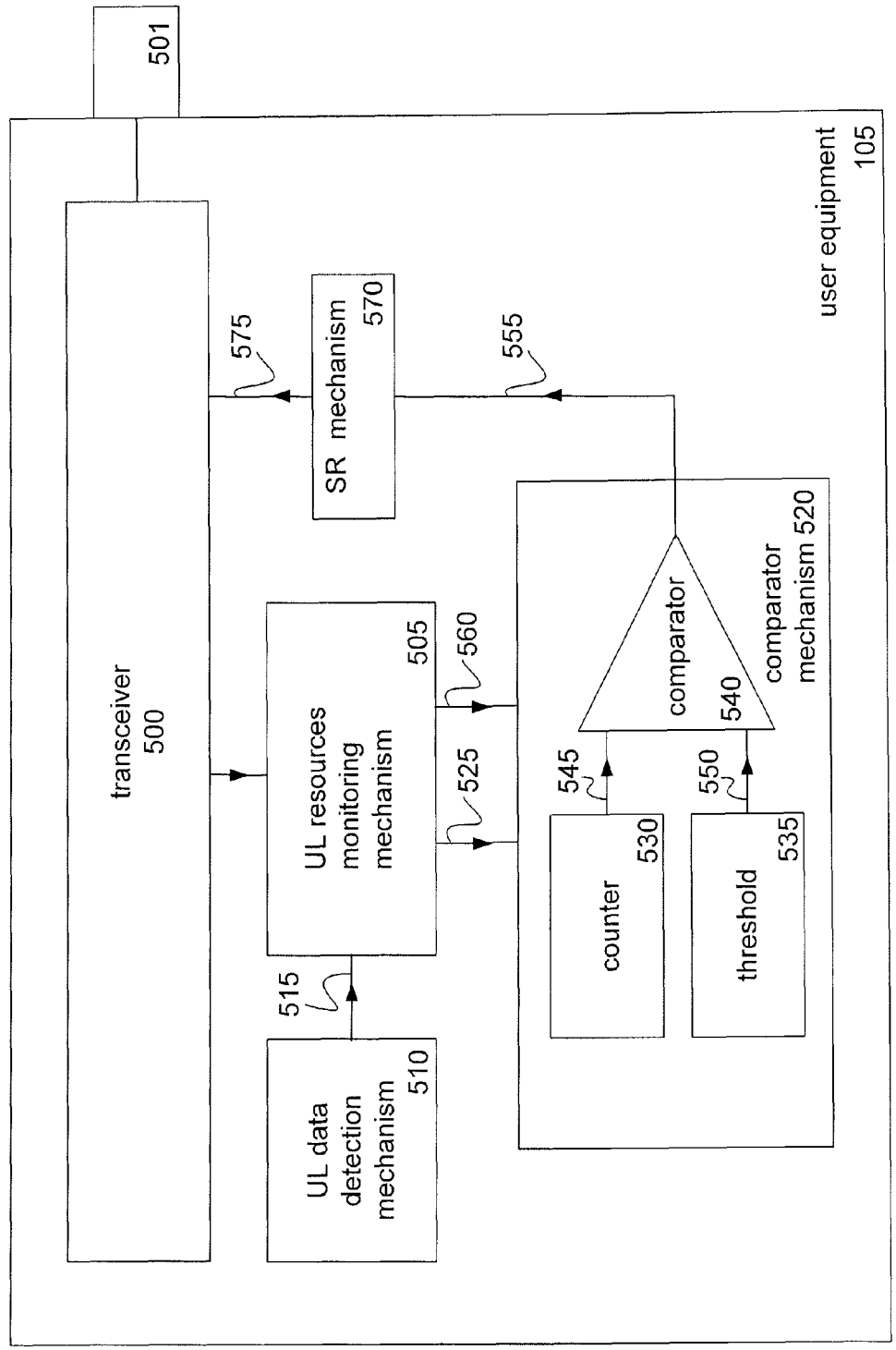
FIG. 5 is a schematic illustration of an embodiment of a user equipment according to the present invention.

FIG. 5 schematically illustrates an example of a user equipment 105 wherein the invention is applied. The user equipment 105 inter alia comprises a transceiver 500 connected to an antenna 501, the transceiver being for transmission and reception of signaling and user data. The transceiver 500 is further connected inter alia to a UL resources monitoring mechanism 505, which is adapted to receive, via transceiver 500, information on transmission resources that are scheduled for the user equipment 105. UL resources monitoring mechanism 505 is further connected to UL data detection mechanism 510, which is adapted to detect any uplink data that is to be transmitted from the user equipment 105. UL data detection mechanism 510 could for example be part of, or connected to, a user application in the user equipment 105. UL data detection mechanism 510 is adapted to inform, via transmission of a signal 515, the UL resources monitoring mechanism 505 of detected uplink data.

UL resources monitoring mechanism 505 is adapted to, upon receipt of an indication signal 515 indicating that uplink data to be transmitted has been detected, determine whether there are any uplink transmission resources available for the uplink data. If so, the data is transmitted by use of the transceiver 500 in a known manner. However, in the case when no uplink resources have yet been scheduled, the UL resources monitoring mechanism of FIG. 5 is adapted to send a signal 525 to a comparator mechanism 520, to which the UL resources monitoring mechanism 505 is connected. The UL resources monitoring mechanism 505 could advantageously also be adapted to monitor when the next PUCCH SR resource occurs. UL resources monitoring mechanism 505 would then advantageously be further adapted to re-send a signal 525 to the comparator mechanism 520 if UL resources monitoring mechanism 505 detects that no uplink resources have been granted for the transmission of the detected data in time for the occurrence of the next PUCCH SR resource.

The comparator mechanism 520 of FIG. 5 comprises a counter 525, a memory 535 adapted to hold a (typically pre-determined) threshold value, and a comparator 540, which is connected to the output 545 of the counter 530 and the output 550 of the memory 535 and adapted to compare the two outputs. The comparator 540 is furthermore adapted to generate an output 555 in response to the result of the comparison of outputs 545 and 550.

The counter 530 of comparator mechanism 520 may for example be a timer adapted to count the time lapsed since the counter 530 was initiated, or the counter could be adapted to count the number of signals received by the comparator mechanism 520 from the UL resources mechanism 505 or the number of scheduling requests transmitted over PUCCH since the counter 530 was initiated.

The comparator mechanism 520 of FIG. 5 is arranged so that the comparator 540 is triggered by receipt of a signal 525 from the UL resources monitoring mechanism. If the counter 530 is adapted to count the number of scheduling requests transmitted by the user equipment 105 or the number of signals 525 received by comparator mechanism 520, the comparator mechanism 520 will be further adapted to increment the counter 530 upon receipt of a signal 525—either prior to or after the comparison is made by the comparator 540 (the threshold value would be set accordingly).

The UL resources monitoring mechanism 505 of FIG. 5 could advantageously be adapted to send, upon successful uplink scheduling (i.e. receipt of an UL-SCH grant message 2D), a signal 560 to the comparator mechanism 520 indicating that the value of counter 530 should be set to zero. Alternatively, a signal 560 indicating that the counter 530 should be set to zero could be sent in connection with the transmission of the first signal 525 after the UL data has been detected. When the counter 530 is a timer, the comparator mechanism 520 could advantageously be adapted to initiate (start) the counter 530 upon receipt of the first signal 525 received from the UL resources monitoring mechanism 505 after the counter has been set to zero. When the counter 530 is adapted to count the number of signals received from the UL resources monitoring mechanism 505 or the number of scheduling requests 2B transmitted, the setting to zero of the counter 530 could be seen as the initiation of the counter 530, or a separate initiation could be applied. The signals 525 and 560, although illustrated as separate signals in FIG. 5, could be represented by two possible values of a signal.

As mentioned above, the comparator mechanism 520 is adapted to generate an output signal 555, indicating whether or not the value of counter 530 has reached its threshold value. Comparator mechanism 520 is further adapted to feed this output 555 to an SR mechanism 570, adapted to determine, based on the comparator output 555, whether a scheduling request 2B should be transmitted on the PUCCH, or whether an RA transmission 3C should be sent on RACH. The SR mechanism 570 is further adapted to instruct the transceiver 500, via output 575, to send a scheduling request on PUCCH if the output 555 indicates that the value of counter 530 has not yet reached its threshold value, and to send an RA transmission 3C on RACH if the output 555 indicates that the value of counter 530 has reached its threshold value.

The mechanisms illustrated in FIG. 5 could be implemented in other ways, and the embodiment shown in FIG. 5 is given as an example only. For example, the SR mechanism 570 could be implemented as part of the transceiver 500 or the comparator mechanism 520; the UL resources monitoring mechanism 505 could be implemented as part of the comparator mechanism 520, etc.

Although the present invention would function appropriately without any modifications of the current e-nodeB 110, the communications system 100 could be further improved by modifying also the e-nodeB 110. As mentioned above, the e-nodeB 110 could be arranged to conclude that the RA transmission 3C was sent from a user equipment 105 having unsuccessfully attempted to send scheduling request transmissions 2B on the PUCCH, by identifying that the sender of the RA transmission 3C has access to PUCCH resources. The e-nodeB 110 could be further adapted to update any of the parameters of expression (1) that are under the control of the e-nodeB 110 in response to such conclusion, and/or to refrain from sending a new TA value to the user equipment 105 as discussed above. In a communications system 100 where the user equipment 105 can either keep or release its PUCCH and/or SRS resources upon sending of the RA transmission 3C, the e-nodeB 110 can advantageously be adapted to interpret information in the RA transmission 3C regarding whether or not the PUCCH and/or SRS resources have been kept, for example by identifying the preamble included in the RA transmission 3C as belonging/not belonging to a group of preambles reserved for user equipments 105 that have released its PUCCH resources. Furthermore, the e-nodeB 110 can be adapted so that no re-configuration message for re-configuring PUCCH and/or SRS will be transmitted in response to an RA transmission 3C from a user equipment 105 that has kept its PUCCH and/or SRS resources. Moreover, the e-nodeB could be arranged to identify, in response to an RA transmission 3C from a user equipment that has released its PUCCH and/or SRS resources, that the PUCCH and/or SRS resources are available for allocation to user equipments 105 in need of such resources.

The UL data detection mechanism 510, the UL resources monitoring mechanism 505, the comparator mechanism 520 and the SR mechanism 570, as well as the mechanism in the e-nodeB 110 adapted to conclude that a user equipment 110 has been unsuccessful in transmitting on the PUCCH (cf. event 3G of FIG. 3c) could advantageously be implemented as a suitable combination of hardware and software.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A method for requesting scheduling of resources to be used for uplink communication of data from a user equipment in a communications system, the method comprising:
   monitoring that a threshold value representing a maximum limit of scheduling requests has been reached;
   releasing uplink control channel resources; and
   initiating a random access transmission on a random access channel in response to said threshold value having been reached;
   wherein the threshold value representing the maximum limit is a maximum number of scheduling requests transmitted by the user equipment and wherein the number of scheduling requests that the user equipment repeatedly transmits on a dedicated uplink control channel in relation to the data while not having been granted uplink resources is limited by the threshold value representing a maximum limit of scheduling requests; and
   wherein releasing uplink control channel resources comprises releasing uplink control channel resources based on no uplink resources having been granted and the threshold value having been reached.

2. The method of claim 1, comprising:
   initiating a measure used for limiting the number of transmitted scheduling requests;
   checking whether the measure has reached the threshold value;
   when no uplink resources have been granted and the measure has not reached the threshold value, transmitting a scheduling request on an uplink control channel, and repeating the step of checking ; and
   when no uplink resources have been granted and the measure has reached the threshold value, transmitting the random access transmission on the random access channel.

3. The method of claim 1, wherein a cell to which the user equipment is currently connected is maintained as the selected cell when the threshold value has been reached without performing cell evaluation.

4. The method of claim 1, wherein, when no uplink resources have been granted and the threshold value has been reached, the method further comprises:
   including an indication, in the random access transmission, indicating that the uplink control channel has been released.

5. The method of claim 1, wherein the dedicated uplink control channel is a physical uplink control channel (PUCCH).

6. The method of claim 1, wherein releasing uplink control channel resources comprises releasing uplink control channel resources prior to initiating the random access transmission.

7. A user equipment for communicating in a communications system, the user equipment being configured to:
   monitor that a maximum limit of scheduling requests has been reached;
   release any dedicated uplink control channel resources; and
   initiate a random access transmission on the random access channel in response to said maximum limit having been reached;
   wherein the threshold value representing the maximum limit is a maximum number of scheduling requests transmitted by the user equipment and wherein the number of scheduling requests that the user equipment repeatedly transmits in relation to the same uplink data on an uplink control channel while not having been granted uplink resources is limited by the threshold value representing the maximum limit of scheduling requests; and
   wherein the user equipment is configured to release any dedicated uplink control channel resources based on said maximum number of scheduling requests being reached and no uplink resources having been granted.

8. The user equipment of claim 7, comprising:
a counter circuit configured to initiate a counter used for limiting the number of transmitted scheduling requests;
a comparator circuit configured to compare an output of the counter with a threshold value representing said maximum limit and for generating a comparison output in dependency of the result of the comparison;
a scheduling request circuit configured to determine, based on the comparison output, whether a scheduling request should be transmitted on the uplink control channel or whether a random access transmission should be made on the random access channel, and for instructing the transceiver accordingly.

9. The user equipment of claim 8, wherein the counter is arranged to increment its value upon the transmission of a scheduling request on an uplink control channel.

10. The user equipment of claim 8, wherein the counter is arranged to measure the time lapsed since the counter was initiated.

11. The user equipment of claim 7, comprising:
a transceiver capable of receiving uplink scheduling information, transmitting scheduling requests on an uplink control channel, and transmitting random access transmissions on a random access channel;
an uplink resources monitoring mechanism connected to the transceiver and being capable of determining whether any uplink resources are available for transmission of data and of generating an uplink resources monitoring output in dependency of the result of the determining;
a counter capable of counting a measure used for limiting the number of transmitted scheduling requests, the measure comprising a time or the number of transmitted scheduling requests;
a memory for storing a threshold value representing the maximum limit;
a comparator arranged to receive the threshold value and an output of the counter, the comparator being adapted to compare the output of the counter with the threshold value and to generate a comparison output;
a scheduling request mechanism configured to receive the comparison output and to determine, in dependency of the comparison output, whether a scheduling request should be transmitted on an uplink control channel whether a random access transmission should be made on a random access channel, and being further adapted to instruct the transceiver accordingly;
wherein the threshold value representing the maximum limit is a maximum number of scheduling requests transmitted by the user equipment and wherein the number of scheduling requests that the user equipment repeatedly transmits in relation to the same uplink data on an uplink control channel while not having been granted uplink resources is limited by the threshold value representing the maximum limit of scheduling requests.

12. The user equipment of claim 7, wherein the dedicated uplink control channel is a physical uplink control channel (PUCCH).

13. The user equipment of claim 7, wherein the user equipment is configured to release any dedicated uplink control channel resources prior to initiating the random access transmission.

14. A computer program product for use in a procedure for requesting scheduling of resources to be used for uplink communication of data from a user equipment in a communications system, wherein the computer program product comprises computer program code portions stored in a non-transitory computer readable medium, the computer program product comprising:
computer program code portions for monitoring whether a threshold value representing a maximum limit of scheduling requests has been reached in order to limit the number of scheduling requests that the user equipment will repeatedly transmit on a dedicated uplink control channel in relation to the data while not having been granted uplink resources;
computer program code portions for releasing resources for the dedicated uplink control channel; and
computer program code portions for initiating a random access transmission on a random access channel in response to said threshold value having been reached;
wherein the threshold value representing the maximum limit is a maximum number of scheduling requests transmitted by the user equipment, and
wherein computer program code portions for releasing resources for the dedicated uplink control channel comprise code portions for releasing resources for the dedicated uplink control channel based on the maximum limit of scheduling requests being reached and no uplink resources having been granted.

15. The computer program product of claim 14, wherein the dedicated uplink control channel is a physical uplink control channel (PUCCH).

16. The computer program product of claim 14, wherein computer program code portions for releasing resources for the dedicated uplink control channel comprise code portions for releasing resources for the dedicated uplink control channel prior to initiating the random access transmission.

* * * * *